(12) United States Patent
Sato et al.

(10) Patent No.: US 11,655,358 B2
(45) Date of Patent: May 23, 2023

(54) CELLULOSE FIBER-REINFORCED POLYOLEFIN RESIN COMPOSITION AND RESIN MOLDED PRODUCT

(71) Applicant: TOYODA GOSEI CO., LTD., Kiyosu (JP)

(72) Inventors: Atsuko Sato, Kiyosu (JP); Hitoshi Uchida, Kiyosu (JP); Yasuaki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/676,473

(22) Filed: Feb. 21, 2022

(65) Prior Publication Data

US 2022/0325085 A1 Oct. 13, 2022

(30) Foreign Application Priority Data

Mar. 31, 2021 (JP) .............................. JP2021-059585

(51) Int. Cl.
*C08L 23/12* (2006.01)

(52) U.S. Cl.
CPC .......... *C08L 23/12* (2013.01); *C08L 2205/035* (2013.01); *C08L 2205/16* (2013.01)

(58) Field of Classification Search
CPC .. C08L 51/06; C08L 23/06; C08L 1/02; C08L 2205/16; C08L 2205/035
See application file for complete search history.

(56) References Cited

U.S. PATENT DOCUMENTS

| | | | | |
|---|---|---|---|---|
| 5,120,776 A | * | 6/1992 | Raj | ........................... C08J 5/06 |
| | | | | 524/36 |
| 2011/0263758 A1 | * | 10/2011 | Wu | ........................ C08L 97/02 |
| | | | | 524/13 |
| 2012/0214911 A1 | | 8/2012 | Yano et al. | |
| 2020/0190305 A1 | * | 6/2020 | Sawada | ..................... C08L 1/00 |

FOREIGN PATENT DOCUMENTS

| | | | |
|---|---|---|---|
| JP | 2016-169382 A | | 9/2016 |
| JP | 2019-006997 A | | 1/2019 |
| JP | 2019111666 A | * | 7/2019 |
| JP | 2019111727 A | * | 7/2019 |
| JP | 2020-075950 A | | 5/2020 |
| WO | 2011/049162 A1 | | 4/2011 |

* cited by examiner

*Primary Examiner* — Marks Kaucher
(74) *Attorney, Agent, or Firm* — Posz Law Group, PLC

(57) ABSTRACT

A cellulose fiber-reinforced polyolefin resin composition contains a polyolefin resin, a cellulose fiber having a fiber length of 1 μm or more, an acid-modified elastomer, and high-density polyethylene. In the composition, an amount of the cellulose fiber is 6 to 95 parts by mass relative to 100 parts by mass of the polyolefin resin, an amount of the acid-modified elastomer is 0.5 to 1.2 times by mass the amount of the cellulose fiber; and, an amount of the high-density polyethylene is 15 to 55 parts by mass relative to 100 parts by mass of the polyolefin resin.

12 Claims, 1 Drawing Sheet

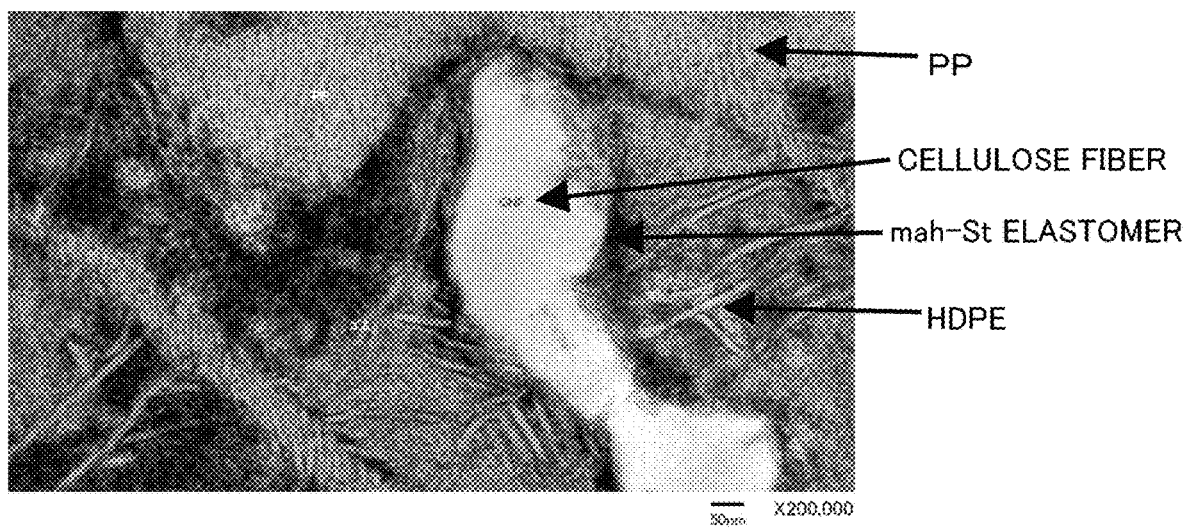

CELLULOSE FIBER-REINFORCED POLYOLEFIN RESIN COMPOSITION AND RESIN MOLDED PRODUCT

TECHNICAL FIELD

The present invention relates to a cellulose fiber-reinforced polyolefin resin composition and a resin molded product.

BACKGROUND ART

Cellulose fiber is a plant-derived fiber, and studies have been conducted on a resin compound containing cellulose fiber as a reinforcing filler that achieves carbon neutral and exhibits high strength.

Patent Document 1 discloses a polyolefin resin molded product containing a microfibrillated plant fiber. The polyolefin resin molded product exhibits high strength and high elastic modulus, and is produced by uniformly dispersing the microfibrillated plant fiber, which has high hydrophilicity, in a highly hydrophobic polyolefin through use of a polymer compound modified with maleic anhydride in combination with an amine polymer compound having a primary amino group.

Patent Document 2 discloses a molded product containing a matrix material (e.g., a polymer) and a derivative fiber prepared through chemical modification (modification with an acyloxy group, an oxy group, or a thio group at position a of a phenylpropane unit of lignin) of a microfibrillated lignocellulose fiber obtained by defibration of a lignocellulose-containing fiber into the order of nanometers. According to this patent document, the derivative fiber exhibits high strength, does not aggregate in the matrix material of the composition, and contributes to an increase in the strength of the molded product.

Patent Document 3 discloses a fiber-reinforced resin composition containing a microfibrillated cellulose fiber prepared through chemical modification (substitution of the hydrogen atoms of some hydroxyl groups of lignin with a functional group such as an acyl group), an inorganic filler such as glass fiber or carbon fiber, and a thermoplastic resin such as polyamide or polyolefin. According to this patent document, the cellulose fiber exhibits good dispersibility in the fiber-reinforced resin composition, and the fiber-reinforced resin composition containing both the cellulose fiber and the inorganic filler exhibits low specific gravity and high strength properties (elastic modulus and strength), as compared with a composition containing only the inorganic filler.

Patent Document 4 discloses a fiber-reinforced resin composition containing a microfibrillated cellulose fiber prepared through chemical modification (substitution of the hydrogen atoms of some hydroxyl groups of lignin with a functional group such as an acyl group), a plant fiber such as ramie or hemp, and a thermoplastic resin such as polyamide or polyolefin. According to this patent document, the cellulose fiber exhibits good dispersibility in the fiber-reinforced resin composition, and the fiber-reinforced resin composition is lighter than a fiber-reinforced resin composition containing, for example, glass fiber.

CITATION LIST

Patent Documents

[Patent Document 1] International Publication WO 2011/049162

[Patent Document 2] Japanese Unexamined Patent Application Publication No. 2016-169382 (JP 2016-169382 A)

[Patent Document 3] Japanese Unexamined Patent Application Publication No. 2019-6997 (JP 2019-6997 A)

[Patent Document 4] Japanese Unexamined Patent Application Publication No. 2020-75950 (JP 2020-75950 A)

SUMMARY OF THE INVENTION

Technical Problem

In particular, the development of a cellulose fiber-reinforced polyolefin resin composition for automobile parts faces a problem in that the impact strength of the composition is lowered, although the elastic modulus and strength of the composition can be readily improved. This problem is probably attributed to the fact that cellulose fiber, which is a highly hydrophilic fiber having a hydroxyl group, exhibits weak interfacial interaction with polyolefin (i.e., highly hydrophobic resin), and impact on the composition may cause breakage (due to exfoliation) at the interface between the cellulose fiber and the polyolefin.

Patent Document 1 describes an example technique for using a polymer compound modified with maleic anhydride as a compatibilizing agent to thereby improve the interfacial adhesion between a microfibrillated plant fiber and polyolefin. However, the technique exhibits only a small effect on impact resistance.

Patent Documents 2 to 4 describe an example technique for chemically modifying a microfibrillated cellulose fiber to thereby improve the dispersibility of the fiber in a resin composition. However, the chemical modification requires great care, time, and cost, and the technique exhibits only a small effect on impact resistance.

Thus, an object of the present invention is to provide a cellulose fiber-reinforced polyolefin resin composition exhibiting improved flexural modulus and impact strength, and a resin molded product produced from the composition.

Solution to Problem

The present inventors have found that the use of an acid-modified elastomer as an acid-modified polymer compound and incorporation of high-density polyethylene can reduce the exfoliation between cellulose fiber having a fiber length of 1 μm or more and a polyolefin resin composition. The present inventors have conducted further studies and have accomplished the present invention.

[1] Cellulose Fiber-Reinforced Polyolefin Resin Composition

A cellulose fiber-reinforced polyolefin resin composition containing a polyolefin resin, a cellulose fiber (preferably derived from a plant) having a fiber length of 1 μm or more, an acid-modified elastomer, and high-density polyethylene, wherein:

an amount of the cellulose fiber is 6 to 95 parts by mass relative to 100 parts by mass of the polyolefin resin;

an amount of the acid-modified elastomer is 0.5 to 1.2 times by mass the amount of the cellulose fiber; and an amount of the high-density polyethylene is 15 to 55 parts by mass relative to 100 parts by mass of the polyolefin resin.

[Effects]

The compatibilizing effect of the acid-modified elastomer can enhance the interfacial brittleness between the cellulose fiber and the polyolefin resin, to thereby reduce breakage (exfoliation) at the interface. The high-density polyethylene improves the impact resistance and rigidity of the resultant composite material. The resin composition exhibits improved flexural modulus and impact strength by virtue of these effects, and achieves well-balanced flexural modulus and impact strength applicable to interior or exterior parts for automobiles. The incorporation of the cellulose fiber contributes to a reduction in weight, and the use of the cellulose fiber, which is a plant-derived raw material, leads to a reduction in environmental load.

Preferably, the acid-modified elastomer is present so as to be in contact with a periphery of the cellulose fiber, and the high-density polyethylene is present so as to be within the acid-modified elastomer or in contact with a periphery of the acid-modified elastomer.

When the acid-modified elastomer is present so as to be in contact with the periphery of the cellulose fiber (in other words, when the cellulose fiber is embedded in the acid-modified elastomer), the aforementioned compatibilizing effect is increased, and the aforementioned interfacial brittleness is effectively enhanced. When the high-density polyethylene is present so as to be within the acid-modified elastomer or in contact with the periphery of the acid-modified elastomer, the aforementioned impact resistance and rigidity are effectively improved.

[2] Cellulose Fiber-Reinforced Polyolefin Resin Composition

A cellulose fiber-reinforced polyolefin resin composition containing a polyolefin resin, a cellulose fiber (preferably derived from a plant) having a fiber length of 1 µm or more, an acid-modified elastomer, and high-density polyethylene, wherein: the composition exhibits a specific rigidity (=flexural modulus (at room temperature)/specific gravity) of 1,700 MPa or more; and the composition exhibits a Charpy impact strength (at room temperature) of 7 kJ/m$^2$ or more.

The polyolefin resin described above in [1] or [2] is preferably a polypropylene resin.

[3] Resin Molded Product

A resin molded product produced by molding of the cellulose fiber-reinforced polyolefin resin composition described above in [1] or [2].

The resin molded product is preferably an interior or exterior part for an automobile.

Advantageous Effects of Invention

The present invention can provide a cellulose fiber-reinforced polyolefin resin composition exhibiting improved flexural modulus and impact strength, and a resin molded product produced from the composition.

BRIEF DESCRIPTION OF DRAWINGS

FIG. 1 is a transmission electron microscope (TEM) photograph (magnification: ×200,000) of a cellulose fiber-reinforced polyolefin resin composition of Example 1.

DESCRIPTION OF EMBODIMENTS

[1] Polyolefin Resin

Examples of the polyolefin resin include, but are not particularly limited to, polypropylene (PP), polyethylene (PE), ethylene-vinyl acetate copolymer (EVA), and polymethylpentene (TPX).

In particular, a polypropylene resin is likely to achieve both high mechanical properties and low cost. In addition, a polypropylene resin exhibits excellent compatibility with high-density polyethylene, and thus can suppress interfacial brittleness, to thereby reduce breakage (exfoliation) at the interface. Consequently, the entire cellulose fiber-reinforced polyolefin resin composition exhibits improved flexural modulus and impact strength, and achieves well-balanced flexural modulus and impact strength applicable to interior or exterior parts for automobiles.

No particular limitation is imposed on the polypropylene resin to be used. However, the polypropylene resin preferably exhibits a melt flow rate (MFR) of 5 to 120 g/10 minutes, more preferably 10 to 100 g/10 minutes, as measured according to ISO 1133 at 230° C. and 21.2 N, since the resultant resin composition exhibits appropriate fluidity.

[2] Cellulose Fiber

Examples of the cellulose fiber include, but are not particularly limited to, plant-derived cellulose fibers having a fiber length of 1 µm or more, such as cellulose microfiber (CMF) and cellulose nanofiber (CNF).

CMF is a cellulose fiber having a diameter into the order of micrometers. Examples of the usable CMF include powdered cellulose (trade name "KC FLOCK" available from Nippon Paper Industries Co., Ltd., short fiber having an average fiber diameter of 10 to 100 µm and an average aspect ratio of 4 to 10 (Japanese Unexamined Patent Application Publication No. 1997-295947 (JP 1997-295947 A))), and cellulose fiber (trade name "ARBOCEL" available from Rettenmaier, fiber diameter: 15 to 35 µm, fiber length: 18 to 2,200 µm).

CNF is a cellulose fiber having a diameter into the order of nanometers. Examples of the usable CNF include microfibrillated cellulose fibers described in Patent Documents 1 to 4 described above.

[3] Acid-Modified Elastomer

Examples of the elastomer modified with an acid include, but are not particularly limited to, styrenic elastomers and ethylene-α-olefin copolymer elastomers.

Examples of the modification group for acid modification include, but are not particularly limited to, maleic anhydride, acrylic acid, and glycidyl methacrylate.

No particular limitation is imposed on the amount of modification (grafting), and the amount of modification may be, for example, 0.1 to 10 wt %. A small amount of modification leads to poor reactivity of the elastomer to the cellulose, resulting in failure to embed all cellulose interfaces. Meanwhile, a large amount of modification leads to formation of a brittle elastomer and poor dispersibility of the elastomer in the polypropylene resin, resulting in failure to be present at cellulose interfaces.

[4] High-Density Polyethylene

No particular limitation is imposed on the high-density polyethylene (HDPE) to be used. However, the HDPE preferably exhibits an MFR (190° C., 21.2 N) of 2.0 g/10 minutes or less and a density of 0.93 or more, for the following reasons. HDPE exhibiting an MFR of more than 2.0 g/10 minutes has a low molecular weight and is less likely to improve impact resistance, whereas HDPE having a density of less than 0.93 is less likely to improve rigidity.

[5] Additional Additive

The composition of the present invention may contain an additional filler such as talc or whisker for improving rigidity.

Similarly, the composition may contain a resin (e.g., polyamide) having a higher elastic modulus than the polyolefin resin.

The composition may also contain, for example, a filler (e.g., calcium carbonate, kaolin clay, or mica), an antioxidant, an ultraviolet absorber, a photostabilizer, a flame retardant, or a colorant.

[6] Kneading

No particular limitation is imposed on the kneading method or conditions. Kneading can be performed with, for example, a twin screw kneading extruder or a Banbury mixer.

[7] Resin Molded Product

Examples of the resin molded product include, but are not particularly limited to, interior or exterior parts (including outer panels) of automobiles, interior or exterior parts (including outer panels) of railway vehicles and buildings, and housings and parts of electric appliances. Examples of the interior or exterior parts of automobiles include a bonnet hood, a fender, a bumper, a door, a trunk lid, a roof, a radiator grille, a hubcap, an instrument panel, and a pillar garnish.

EXAMPLES

Resin compositions of Examples (shown in Table 1 below) and Comparative Examples (shown in Table 2 below) were prepared through formulation and kneading. Each of the resin compositions was subjected to injection molding to produce a molded product. The physical properties of the molded product were examined.

TABLE 1

| | | | Example 1 | Example 2 | Example 3 | Example 4 | Example 5 | Example 6 |
|---|---|---|---|---|---|---|---|---|
| Formulation | Polypropylene | YUPLENE BX3920 | 100 | 100 | 100 | 100 | 100 | 100 |
| | Cellulose Fiber | ARBOCEL FD600-30 | 27.3 | | 27.3 | 27.3 | 27.3 | 27.3 |
| | | KC FLOCK W-100 | | 27.3 | | | | |
| | Acid-Modified Elastomer | mah-SEBS | 23.6 | 23.6 | | | | 23.6 |
| | | mah-EBM | | | 23.6 | | | |
| | | acly-EVA | | | | 23.6 | | |
| | | E-GMA-VA | | | | | 23.6 | |
| | Additional Polymer | HDPE | 30.9 | 30.9 | 30.9 | 30.9 | 30.9 | 18.2 |
| | | mah-MDPE | | | | | | 12.7 |
| | | LDPE | | | | | | |
| | | SEPS | | | | | | |
| | | mah-PP | | | | | | |
| | | Polyamide PA6 | | | | | | |
| | Whisker | Magnesium Sulfate | | | | | | |
| | Talc | Average particle diameter 4.7 μm | | | | | | |
| Property | Total | | 181.8 | 181.8 | 181.8 | 181.8 | 181.8 | 181.8 |
| | Specific Gravity | | 0.99 | 0.99 | 0.99 | 0.99 | 0.98 | 0.98 |
| | Bending Strength (Mpa) | | 33 | 32 | 31 | 33 | 30 | 30 |
| | Flexural Modulus (Mpa) Target value: 1500 or more | | 1750 | 1740 | 1720 | 1810 | 1700 | 1710 |
| | Specific Rigidity Target value: 1700 or more | | 1768 | 1758 | 1737 | 1828 | 1735 | 1745 |
| | Charpy Impact Value (kJ/m$^2$) Target value: 7 or more | | 9.5 | 9.2 | 8.5 | 8.3 | 11.1 | 10.4 |
| | Tensile Yield Strength (Mpa) | | 21 | 21 | 20 | 22 | 20 | 19 |
| | Tensile Elongation at Break (%) | | 19 | 19 | 22 | 18 | 23 | 24 |
| | MFR (230° C., 21.1 N) (g/10 minutes) | | 9.2 | 8.9 | 7.5 | 6.9 | 5.7 | 7.8 |

| | | | Example 7 | Example 8 | Example 9 | Example 10 | Example 11 | Example 12 |
|---|---|---|---|---|---|---|---|---|
| Formulation | Polypropylene | YUPLENE BX3920 | 100 | 100 | 100 | 100 | 100 | 100 |
| | Cellulose Fiber | ARBOCEL FD600-30 | 27.3 | 30.6 | 30.6 | 30.6 | 6.8 | 90.9 |
| | | KC FLOCK W-100 | 14.5 | | | | 6.8 | 60.6 |
| | Acid-Modified Elastomer | mah-SEBS | | | | | | |
| | | mah-EBM | 30.9 | 34.7 | 34.7 | 34.7 | 23.3 | 51.5 |
| | | acly-EVA | | | | 12.2 | | |
| | | E-GMA-VA | | | 12.2 | | | |
| | Additional Polymer | HDPE | | 12.2 | | | | |
| | | mah-MDPE | | | | | | |
| | | LDPE | | | | | | |
| | | SEPS | 9.1 | | | | | |
| | | mah-PP | | | | | | |
| | | Polyamide PA6 | | | | 12.2 | | |
| | Whisker | Magnesium Sulfate | | | 12.2 | | | |
| | Talc | Average particle diameter 4.7 μm | | 12.2 | | | | |
| Property | Total | | 181.8 | 204 | 204 | 204 | 136.9 | 303 |
| | Specific Gravity | | 0.99 | 1.01 | 1.01 | 1.01 | 0.94 | 1.01 |
| | Bending Strength (Mpa) | | 33 | 34 | 35 | 33 | 31 | 42 |
| | Flexural Modulus (Mpa) Target value: 1500 or more | | 1760 | 1820 | 1850 | 1790 | 1610 | 2270 |
| | Specific Rigidity Target value: 1700 or more | | 1778 | 1802 | 1832 | 1772 | 1713 | 2248 |
| | Charpy Impact Value (kJ/m$^2$) Target value: 7 or more | | 9.3 | 7.9 | 7.5 | 8.6 | 17 | 7.5 |
| | Tensile Yield Strength (Mpa) | | 20 | 23 | 24 | 22 | 21 | 31 |
| | Tensile Elongation at Break (%) | | 22 | 17 | 17 | 19 | 18 | 12 |
| | MFR (230° C., 21.1 N) (g/10 minutes) | | 9.1 | 7.2 | 7.0 | 8.1 | 11.6 | 2.6 |

TABLE 2

|  |  |  | Comparative Example 1 | Comparative Example 2 | Comparative Example 3 | Comparative Example 4 | Comparative Example 5 |
|---|---|---|---|---|---|---|---|
| Formulation | Polypropylene | YUPLENE BX3920 | 100 | 100 | 100 | 100 | 100 |
|  | Cellulose Fiber | ARBOCEL FD600-30 | 4.5 | 175 | 27.3 | 23.1 | 39.5 |
|  |  | KC FLOCK W-100 |  |  |  |  |  |
|  | Acid-Modified Elastomer | mah-SEBS | 3.4 | 125 |  | 20 | 78.9 |
|  |  | mah-EBM |  |  |  |  |  |
|  |  | acly-EVA |  |  |  |  |  |
|  |  | E-GMA-VA |  |  |  |  |  |
|  | Additional Polymer | HDPE | 5.7 | 100 | 30.9 | 10.8 | 44.7 |
|  |  | mah-MDPE |  |  |  |  |  |
|  |  | LDPE |  |  |  |  |  |
|  |  | SEPS |  |  | 23.6 |  |  |
|  |  | mah-PP |  |  |  |  |  |
|  |  | Polyamide PA6 |  |  |  |  |  |
|  | Whisker | Magnesium Sulfate |  |  |  |  |  |
|  | Talc | Average particle diameter 4.7 μm |  |  |  |  |  |
|  |  | Total | 113.6 | 500 | 181.8 | 153.9 | 263.1 |
| Property |  | Specific Gravity | 0.92 | 1.07 | 0.99 | 0.97 | 0.98 |
|  |  | Bending Strength (Mpa) | 21 | 86 | 25 | 38 | 21 |
|  |  | Flexural Modulus (Mpa) Target value: 1500 or more | 1710 | 2930 | 1280 | 1960 | 900 |
|  |  | Specific Rigidity Target value: 1700 or more | 1859 | 2738 | 1293 | 2021 | 918 |
|  |  | Charpy Impact Value (kJ/m$^2$) Target value: 7 or more | 2.6 | 3.9 | 3.2 | 2.3 | 38 |
|  |  | Tensile Yield Strength (Mpa) | 23 | 46 | 17 | 28 | 14 |
|  |  | Tensile Elongation at Break (%) | 12 | 5 | 16 | 10 | 45 |
|  |  | MFR (230° C., 21.1 N) (g/10 minutes) | 18.0 | 3.2 | 8.1 | 11.2 | 1.5 |
|  |  |  | Comparative Example 6 | Comparative Example 7 | Comparative Example 8 | Comparative Example 9 | Comparative Example 10 |
| Formulation | Polypropylene | YUPLENE BX3920 | 100 | 100 | 100 | 100 | 100 |
|  | Cellulose Fiber | ARBOCEL FD600-30 | 40.5 | 27.3 | 27.3 | 27.3 |  |
|  |  | KC FLOCK W-100 |  |  |  |  |  |
|  | Acid-Modified Elastomer | mah-SEBS | 35.1 |  |  | 23.6 | 23.6 |
|  |  | mah-EBM |  |  |  |  |  |
|  |  | acly-EVA |  |  |  |  |  |
|  |  | E-GMA-VA |  |  |  |  |  |
|  | Additional Polymer | HDPE | 94.6 | 30.9 | 30.9 |  | 30.9 |
|  |  | mah-MDPE |  |  |  |  |  |
|  |  | LDPE |  |  |  | 30.9 |  |
|  |  | SEPS |  |  |  |  |  |
|  |  | mah-PP |  |  | 23.6 |  |  |
|  |  | Polyamide PA6 |  |  |  |  |  |
|  | Whisker | Magnesium Sulfate |  |  |  |  |  |
|  | Talc | Average particle diameter 4.7 μm |  |  |  |  | 27.3 |
|  |  | Total | 270.2 | 181.8 | 181.8 | 181.8 | 181.8 |
| Property |  | Specific Gravity | 0.99 | 1.00 | 1.03 | 0.99 | 1.01 |
|  |  | Bending Strength (Mpa) | 26 | 36 | 40 | 26 | 29 |
|  |  | Flexural Modulus (Mpa) Target value: 1500 or more | 1350 | 1920 | 1910 | 1320 | 1500 |
|  |  | Specific Rigidity Target value: 1700 or more | 1364 | 1920 | 1847 | 1333 | 1485 |
|  |  | Charpy Impact Value (kJ/m$^2$) Target value: 7 or more | 13.0 | 4.2 | 2.8 | 5.6 | 6.0 |
|  |  | Tensile Yield Strength (Mpa) | 16 | 26 | 28 | 18 | 25 |
|  |  | Tensile Elongation at Break (%) | 37 | 14 | 8 | 19 | 15 |
|  |  | MFR (230° C., 21.1 N) (g/10 minutes) | 4.3 | 5.7 | 3.6 | 6.2 | 12.0 |

[Formulation]

In Table 1, each numerical value in the row "Formulation" corresponds to parts by mass relative to 100 parts by mass of polypropylene. The formulations and details of components used are as follows.

Polypropylene resin: trade name "YUPLENE BX3920" available from SK Chemical Co., Ltd. (MFR (230° C., 2.16 N): 100 g/10 minutes, yield strength: 32 MPa, flexural modulus: 1.8 GPa).

Cellulose fiber (ARBOCEL FD600-30): cellulose fiber available from Rettenmaier, trade name "ARBOCEL FD600-30" (average fiber diameter: 35 μm, average fiber length: 45 μm).

Cellulose fiber (KC FLOCK W-100): powdered cellulose available from Nippon Paper Industries Co., Ltd., trade name "KC FLOCK W-100" (average fiber diameter: 37 μm, average aspect ratio: 8.5).

Maleic acid-modified styrene-ethylene/butylene-styrene copolymer (mah-SEBS): trade name "Tuftec M1913" (styrene content: 30%) available from Asahi Kasei Corporation.

Maleic acid-modified ethylene-butene copolymer (mah-EBM): trade name "Tafmer MH7020" available from Mitsui Chemicals, Inc.

Acrylic acid-grafted ethylene-vinyl acetate copolymer (acly-EVA): trade name "SCONA TPEV 1110 PB" available from BYK.

Ethylene-glycidyl methacrylate-vinyl acetate copolymer (E-GMA-VA): trade name "BONDFAST 2B" available from Sumitomo Chemical Company, Limited.

High-density polyethylene (HDPE): trade name "Novatec HY540" available from Japan Polyethylene Corporation.

Maleic acid-modified middle-density polyethylene (mah-MDPE): trade name "Adtex FT61AR3" available from Japan Polyethylene Corporation.

Low-density polyethylene (LDPE): trade name "Novatec YF30" available from Japan Polyethylene Corporation.

Styrene-ethylene/propylene-styrene copolymer (SEPS): trade name "SEPTON 2063" (styrene content: 13%) available from KURARAY CO., LTD.

Acid-modified polypropylene (mah-PP): trade name "ADMER QE800" available from Mitsui Chemicals, Inc.

Polyamide (PA6): trade name "AMILAN CM1017" available from Toray Industries, Inc.

Whisker (magnesium sulfate inorganic fiber): trade name "MOS-HIGE" available from Ube Material Industries, Ltd.

Talc: trade name "Micron White #50005" (average particle diameter: 4.7 μm) available from HAYASHI KASEI CO., LTD.

[Kneading]

All components were simultaneously melt-kneaded with a twin screw kneading extruder.

[Injection Molding]

Each of the resin compositions of Examples and Comparative Examples was injected into a cavity of a mold and then molded, to thereby produce a resin molded product according to ISO 527-1A. The molded product was cut into a test piece having predetermined dimensions corresponding to the respective measurements described below. The test piece was subjected to TEM observation and physical property measurements. The measurement results are shown in Table 1.

[TEM Observation]

TEM observation was performed on a thin section of a resin molded product produced from each of the resin compositions of the Examples. For example, as shown in FIG. 1 (TEM photograph of Example 1), an acid-modified elastomer was present so as to be in contact with the periphery of cellulose fiber, and high-density polyethylene was present so as to be within the acid-modified elastomer or in contact with the periphery of the acid-modified elastomer.

[Physical Property Measurement]

(1) Specific Gravity

Specific gravity was measured according to ISO 1183.

(2) Bending Strength, Flexural Modulus, and Specific Rigidity

A test piece (length: 80 mm, width: 10 mm, thickness: 4.0 mm) was subjected to a three-point bending test according to ISO 178 at room temperature (18 to 28° C. (the same shall apply hereinafter)) to thereby measure the bending strength and flexural modulus of the test piece. Also, the specific rigidity (flexural modulus/specific gravity) was calculated.

The target value of flexural modulus was set to 1,500 MPa or more, and the target value of specific rigidity was set to 1,700 MPa or more.

(3) Charpy Impact Value

A test piece having a notch (length: 80 mm, notch depth: 2 mm, thickness: 4.0 mm, notch R: 0.25 mm) was subjected to a Charpy impact test according to ISO 179-1 at room temperature, to thereby measure the Charpy impact value of the test piece.

The target value of Charpy impact value was set to 7 kJ/m² or more.

(4) Tensile Yield Strength and Tensile Elongation at Break

A test piece (1A type) was subjected to a tensile test according to ISO 527 at a tensile speed of 1 mm/minute at room temperature, to thereby measure the tensile yield strength and tensile elongation at break of the test piece.

(5) MFR

MFR was measured according to ISO 1133 at 230° C. and 21.1 N.

As shown in Table 1, the resin molded products of Examples 1 to 12 achieved both the target value of specific rigidity (i.e., 1,700 MPa or more) and the target value of Charpy impact value (i.e., 7 kJ/m² or more). The resin molded products also achieved the target value of flexural modulus (i.e., 1,500 MPa or more).

In contrast, each of the resin molded products of Comparative Examples 1 to 10 did not achieve either or both of the target value of specific rigidity and the target value of Charpy impact value.

The present invention is not limited to the aforementioned examples, and may be appropriately modified and embodied without departing from the spirit of the invention.

The invention claimed is:

1. A cellulose fiber-reinforced polyolefin resin composition comprising a polyolefin resin, a cellulose fiber having a fiber length of 1 μm or more, an acid-modified elastomer, and high-density polyethylene, wherein:
   an amount of the cellulose fiber is 6 to 95 parts by mass relative to 100 parts by mass of the polyolefin resin;
   an amount of the acid-modified elastomer is 0.5 to 1.2 times by mass the amount of the cellulose fiber; and
   an amount of the high-density polyethylene is 15 to 55 parts by mass relative to 100 parts by mass of the polyolefin resin.

2. The cellulose fiber-reinforced polyolefin resin composition according to claim 1, wherein the acid-modified elastomer is present so as to be in contact with a periphery of the cellulose fiber, and the high-density polyethylene is present so as to be within the acid-modified elastomer or in contact with a periphery of the acid-modified elastomer.

3. A cellulose fiber-reinforced polyolefin resin composition comprising a polyolefin resin, a cellulose fiber having a fiber length of 1 μm or more, an acid-modified elastomer, and high-density polyethylene, wherein:
   the composition exhibits a specific rigidity (=flexural modulus (at room temperature)/specific gravity) of 1,700 MPa or more; and
   the composition exhibits a Charpy impact strength (at room temperature) of 7 kJ/m² or more.

4. The cellulose fiber-reinforced polyolefin resin composition according to claim 1, wherein the polyolefin resin is a polypropylene resin.

5. The cellulose fiber-reinforced polyolefin resin composition according to claim 2, wherein the polyolefin resin is a polypropylene resin.

6. The cellulose fiber-reinforced polyolefin resin composition according to claim 3, wherein the polyolefin resin is a polypropylene resin.

7. A resin molded product produced by molding of the cellulose fiber-reinforced polyolefin resin composition according to claim 1.

8. A resin molded product produced by molding of the cellulose fiber-reinforced polyolefin resin composition according to claim 2.

9. A resin molded product produced by molding of the cellulose fiber-reinforced polyolefin resin composition according to claim 3.

10. The resin molded product according to claim 7, wherein the resin molded product is an interior or exterior part for an automobile.

11. The resin molded product according to claim 8, wherein the resin molded product is an interior or exterior part for an automobile.

12. The resin molded product according to claim 9, wherein the resin molded product is an interior or exterior part for an automobile.

\* \* \* \* \*